United States Patent
Kim et al.

(10) Patent No.: US 10,147,131 B2
(45) Date of Patent: Dec. 4, 2018

(54) MERCHANT HOSTED CHECKOUT AT A MERCHANT SERVER

(71) Applicant: BOKU, INC., San Francisco, CA (US)

(72) Inventors: Jang Kim, San Francisco, CA (US); Daniel Keegan Flanigan, San Francisco, CA (US); Wesley D. Mateo, San Francisco, CA (US)

(73) Assignee: Boku, Inc., San Francisco, CA (US)

(*) Notice: Subject to any disclaimer, the term of this patent is extended or adjusted under 35 U.S.C. 154(b) by 911 days.

(21) Appl. No.: 13/934,050

(22) Filed: Jul. 2, 2013

(65) Prior Publication Data
US 2015/0012388 A1    Jan. 8, 2015

(51) Int. Cl.
*G06Q 30/00*    (2012.01)
*G06Q 30/06*    (2012.01)

(52) U.S. Cl.
CPC ............... *G06Q 30/0635* (2013.01)

(58) Field of Classification Search
CPC .... G06Q 30/06–30/0645; G06Q 30/08; G06Q 50/01
USPC ............................. 705/26.1–27.2
See application file for complete search history.

(56) References Cited

U.S. PATENT DOCUMENTS

| | | | | |
|---|---|---|---|---|
| 9,003,078 B2* | 4/2015 | Browne | ............... | G06Q 20/145 710/33 |
| 2006/0080232 A1* | 4/2006 | Epps | ..................... | G06Q 20/02 705/39 |
| 2007/0093243 A1* | 4/2007 | Kapadekar | ........ | H04M 3/42178 455/419 |
| 2007/0250399 A1 | 10/2007 | Dudley et al. | | |
| 2007/0265963 A1* | 11/2007 | Allin | ..................... | G06Q 10/00 705/40 |
| 2008/0027962 A1 | 1/2008 | Rong et al. | | |
| 2008/0313053 A1 | 12/2008 | Li et al. | | |
| 2009/0164328 A1 | 6/2009 | Bishop et al. | | |
| 2011/0212783 A1* | 9/2011 | Dale | ................... | H04L 67/1002 463/42 |
| 2011/0217994 A1 | 9/2011 | Hirson et al. | | |
| 2012/0089521 A1* | 4/2012 | Abrevaya | ........... | G06Q 20/401 705/75 |
| 2012/0157062 A1 | 6/2012 | Kim et al. | | |
| 2014/0101030 A1 | 4/2014 | Santiago, Jr. et al. | | |
| 2014/0108247 A1* | 4/2014 | Artman | .................. | G06Q 20/36 705/44 |
| 2014/0108249 A1 | 4/2014 | Kulpati et al. | | |

OTHER PUBLICATIONS

N. Leavitt, "Payment Applications Make E-Commerce Mobile," in Computer, vol. 43, No. 12, pp. 19-22, Dec. 2010. (Year: 2010).*
International Search Report and Written Opinion dated Nov. 25, 2014, International Patent Application No. PCT/US2014/045231 with International Filing Date of Jul. 2, 2014, (12 pages).

* cited by examiner

Primary Examiner — Adam L Levine
(74) Attorney, Agent, or Firm — Stephen M. De Klerk

(57) ABSTRACT

Merchant hosted checkout as described herein allows merchants to process mobile payments via a customized user payment interface ("checkout interface"). The merchant hosted checkout provides dynamic user interface (UI) instructions and user input requirements based on the country and mobile network (carrier) associated with each transaction.

11 Claims, 9 Drawing Sheets

MERCHANT HOSTED CHECKOUT AT A MERCHANT SERVER

BACKGROUND OF THE INVENTION

1). Field of the Invention

This invention relates to a merchant hosted checkout system and method.

2). Discussion of Related Art

A consumer who shops for goods or services online may often be given the option to use a selection of payment sources during checkout, such as payment by credit card, debit card, payment from an account held by an institution, or to charge for a purchase on their phone bill.

When the consumer selects to charge to their phone bill, a merchant server instructs a billing server which is aligned with a carrier server to carry out the charge. The billing server usually communicates with a consumer mobile phone to confirm the charge before placing the charge on the phone bill at the carrier server.

In such a system of charging the majority of the control resides with the billing server allowing relatively little flexibility for a merchant server to construct a user interface that is both functional and compliant with standards that are required at the billing server.

SUMMARY OF THE INVENTION

The invention provides a method of managing transactions with a merchant server including receiving, with the merchant server, a selection for a product from a consumer device, transmitting, with the merchant server in response to the selection, a first transaction application programmable interface (API) request from the merchant server to a billing server, including parameters, receiving, with the merchant server, a first transaction request response to the first transaction API request to the merchant server, including a transaction status, a user interface template type, a list of user interface elements to display to a consumer device, and next actions for the merchant server to take, transmitting, with the merchant server, a price to the consumer device, receiving, with the merchant server, a mobile subscriber integrated services digital network-number (msisdn) from the consumer device, transmitting, with the merchant server, a second transaction API request from the merchant server at the billing server, including the msisdn; and receiving, with the merchant server, a charge result callback notification from the billing server in response to the second transaction API call.

The invention also provides a non-transitory computer-readable medium having stored thereon a set of instructions which, when executed by a processor of a computer performs a method of managing transactions with a billing server including receiving, with the merchant server, a selection for a product from a consumer device, transmitting, with the merchant server in response to the selection, a first transaction application programmable interface (API) request from the merchant server to a billing server, including parameters, receiving, with the merchant server, a first transaction request response to the first transaction API request to the merchant server, including a transaction status, a user interface template type, a list of user interface elements to display to a consumer device, and next actions for the merchant server to take, transmitting, with the merchant server, a price to the consumer device, receiving, with the merchant server, a mobile subscriber integrated services digital network-number (msisdn) from the consumer device, transmitting, with the merchant server, a second transaction API request from the merchant server at the billing server, including the msisdn and receiving, with the merchant server, a charge result callback notification from the billing server in response to the second transaction API call.

The invention further provides a merchant server including a processor, a computer-readable medium connected to the processor, a transaction application programmable interface (API) request management module stored on the computer-readable medium and executable by the processor to receive, with the merchant server, a selection for a product from a consumer device, transmit, with the merchant server in response to the selection, a first transaction application programmable interface (API) request from the merchant server to a billing server, including parameters, receive, with the merchant server, a first transaction request response to the first transaction API request to the merchant server, including a transaction status, a user interface template type, a list of user interface elements to display to a consumer device, and next actions for the merchant server to take, transmit, with the merchant server, a price to the consumer device, receive, with the merchant server, a mobile subscriber integrated services digital network-number (msisdn) from the consumer device, transmit, with the merchant server, a second transaction API request from the merchant server at the billing server, including the msisdn and receive, with the merchant server, a charge result callback notification from the billing server in response to the second transaction API call.

BRIEF DESCRIPTION OF THE DRAWINGS

The invention is further described by way of example with reference to the accompanying drawings, wherein.

DETAILED DESCRIPTION OF THE INVENTION

Merchant hosted checkout as described herein allows merchants to process mobile payments via a customized user payment interface ("checkout interface"). The merchant hosted checkout provides dynamic user interface (UI) instructions and user input requirements based on the country and mobile network (carrier) associated with each transaction.

Figure 1A:
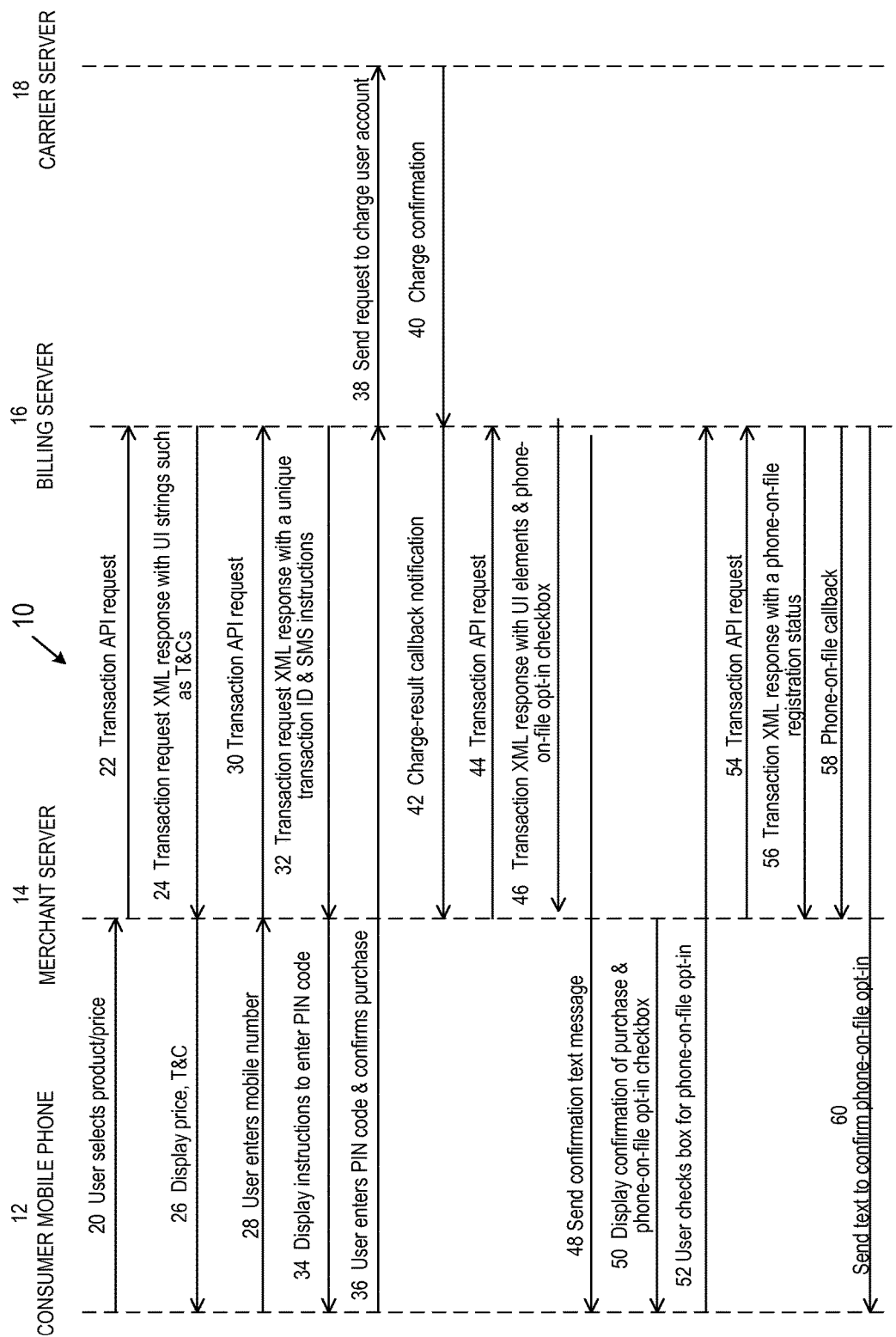
FIGS. 1A and 1B are an interaction diagram showing functioning of a merchant hosted checkout system and method according to an embodiment of the invention.

FIG. 1A of the accompanying drawings illustrates a merchant hosted checkout system 10 according to an embodiment of the invention that includes a consumer mobile phone 12, a merchant server 14, a billing server 16 and a carrier server 18. The consumer mobile phone 12 is connected over the Internet to the merchant server 14. The merchant server 14 is connected over the Internet to the billing server 16. The billing server 16 is connected over the Internet to the carrier server 18. The billing server 16 is also connected over a Short Messaging Service (SMS) data network to the consumer mobile phone 12.

At 20, in FIG. 1A, a user at the consumer mobile phone 12 selects a product and price on the merchant server 14.

At 22, the merchant server 14 transmits a transaction application programmable interface (API) request to the billing server 16. The merchant hosted checkout transaction API call is used to initiate and step through a payment transaction for a specified country. A series of 'transaction' API calls is required to complete a transaction successfully. After each transaction API call the billing server 16 will return a response to the merchant server 14 containing the following details:

1. A transaction status.
2. A UI template type.
3. A list of UI elements to display to the consumer mobile device 12.
4. Next actions for the merchant server 14 to take.

All actions are HTTP POST or HTTP GET requests to specified uniform resource locators (URLs) using inputs collected from the previous step. Once the consumer has completed a successful transaction, the merchant server 14 will receive a final transaction API call response from the billing server 16 indicating that there are no further steps required. When the transaction ultimately completes, the merchant server 14 will also receive a billingresult callback notification from the billing server 16 that will convey the final transaction result. If the merchant has enabled the phone-on-file opt-in feature, the merchant server 14 will also receive the required content to display an option to ask the consumer to place their phone-on-file. The merchant will then receive a phone-on-file opt-in callback to notify the merchant if the consumer has placed their phone-on-file.

The following is an example of a base transaction API call:

Base 'transaction' API URL: https://mhc.billingserver-.com/1.1/transaction
HTTP Method: POST
HTTP Content-Type: application/x-www-form-urlencoded
Example Message Body for 'Transaction' Call
merchant-id=co inmerchant&
service-id=3faee566469704d816bf0ca0&
desc=500+gold+coins&
price-inc-salestax=100&
country=US&
currency=USD&
consumer-ip-address=78.213.246.290&
consumer-id=Y647WBH53&
timestamp=1333159135&
sig=4507c9665d3a24400e86a41b526d177c Table 1 show details of the parameters that are used in a transaction API call.

TABLE 1

| PARAMETER | TYPE | REQUIRED | DESCRIPTION | COMMENTS |
|---|---|---|---|---|
| callback-url | string | No | Reporting this value overrides the callback URL specified on the merchant service. | Can be used to dynamically override the configured callback URL on a per transaction basis. |
| consumer-id | string | No | Merchant provided unique consumer identifier. This can be obfuscated as long as it remains unique for each consumer. | Used by billing server for risk/velocity checks. |
| consumer-ip-address | string | No | IP address of the originating consumer. | Used by billing server for risk/velocity checks. |
| country | string | Yes | Country code in ISO 3166-1-alpha-2 standard. | |
| currency | string | Conditional | Currency code in ISO 4217 standard. Specifies the currency of the 'price-inc-salestax' value. | Required if the 'price-inc-salestax' parameter is reported. |
| desc | string | Yes | The exact quantity and description of the item(s) being purchased. The quantity is required if more than one of an item is being purchased (e.g. "1000 Credits"), the quantity must be included. Overrides the "Product Description" string displayed in the user interface and may be shown in SMS messages sent during transaction processing. | Restrict to 20 characters; longer strings will be truncated. This value is displayed to the consumer in the user interface and is subject to operator approval. Please do not use commas (e.g. use "1000" not "1,000"). |

TABLE 1-continued

| PARAMETER | TYPE | REQUIRED | DESCRIPTION | COMMENTS |
|---|---|---|---|---|
| language | string | No | Two letter ISO 639-1 language code. | If the reported language is supported for the given country, then it will be used in the user interface. Otherwise, the default language for the given country will be used. |
| merchant-id | string | Yes | Your Publisher Portal primary account ID. | Your Publisher Portal account ID was selected during the initial account registration. |
| msisdn | string | No | Pre-populates the mobile phone number field in the user interface. International mobile subscriber integrated services digital network-number. | Can be used when the consumer has a mobile phone number stored on file in the merchant's system. |
| param | string | No | Pass-through parameter for merchant's use. | Restrict to 100 characters. If included, this parameter is provided in the transaction detail within your Publisher Portal reports and included in all billing server callback notifications. |
| price-inc-salestax | number | Conditional | The tax-inclusive value that will be billed to the consumer based on the value type reported in the 'currency' parameter. | Required if not using 'row-ref' parameter. If included, 'currency' parameter is also required. This value must be expressed in fractional currency units, e.g. $1.50 is entered as "150" to denote 150 cents. |
| row-ref | number | Conditional | Row number identifier in the pricing matrix for a configured service in your Publisher Portal account. | Required if not using 'price-inc-salestax' parameter. Note that 'row-ref' numbers are sequential starting at zero: if a row is deleted from the matrix, the numbering of subsequent rows will be updated. |
| service-id | string | Yes | The unique alphanumeric ID of a configured billing server product/service. | |

TABLE 1-continued

| PARAMETER | TYPE | REQUIRED | DESCRIPTION | COMMENTS |
| --- | --- | --- | --- | --- |
| sig | string | Yes | MD5 hash computation signature generated by the publisher. | If included, 'timestamp' parameter is also required. See billing server Security Implementation Guide for details on generating the 'sig' value. |
| styles | string | No | A list of name/value pairs in JSON format for controlling user interface display styles. | Invalid name/value pairs are ignored. See Section 3.5 for more details. |
| sub-merchant-id | string | Conditional | End-merchant identifier when a payment enabler account is being used to conduct the transaction. | Required for all transactions conducted by a payment enabler account. |
| sub-merchant-name | string | No | Name of application, game or website for which this transaction is being conducted. The consumer should recognize this name. Overrides the "Service Name" string displayed in the user interface and may be shown in SMS messages sent during transaction processing. | Restrict to 15 characters; longer strings will be truncated. This value is displayed to the consumer in the user interface and is subject to operator approval. |
| timestamp | string | Yes | Network Time Protocol (NTP) Unix epoch timestamp. | Required if the 'sig' parameter is reported. The API call must be made within 300 seconds of the reported time. |

Only the first 'transaction' API call in the sequence requires the request parameters as listed in Table 1.

In FIG. 1A at 24, the billing server 16 transmits a transaction-request extension markup language (XML) response with UI strings such as terms and conditions (T&Cs).

The XML response indicates all the UI elements that are required to be displayed to the consumer based on the parameters in Table 1 and the required user input action for the next transaction API request. In this first step, the transaction status is returned as not started and the template element value is input. The following is an example of an XML response that is transmitted at 24 in FIG. 1A.

```
<?xml version="1.0" encoding="UTF-8" standalone="yes"?>
<transaction>
    <api-version>1.1</api-version>
    <trx-id>b368363a00bbddbf794eba33</trx-id>
    <buy-url>https://buy.billingserver.com/checkoutidentify/b368363a00bbddbf794eba33/buy.js</buy-url>
    <result-code>0</result-code>
    <result-msg>Operation Successful</result-msg>
    <checkout>
        <transaction-status>NOT_STARTED</transaction-status>
        <template>INPUT</template>
```

```
        <display-state>NORMAL</display-state>
        <strings language="en">
          <string id="HEADING_STR">Please enter your mobile number.</string>
          <string id="SUBHEADING_STR">You will be asked to confirm the transaction via text message.</string>
          <string id="PRICE_DESC_STR">$1.00</string>
          <string id="SERVICE_STR">Coin Merchant Testing</string>
          <string id="ITEM_STR">500 gold coins</string>
          <string id="PURCHASE_ACTION_LABEL">Continue</string>
          <string id="MSISDN_INPUT_LABEL">Mobile number</string>
          <string id="MSISDN_INPUT_HINT">E.g. 123-123-1234</string>
          <string id="TERMS_STR">Charges will be made on your wireless bill or deducted from your prepaid account. Standard message and data rates may apply, plus applicable taxes. Text STOP to shortcode to end. Customer support: contact us or call 877-261-3874. By clicking or pressing "CONTINUE", you confirm that you are the mobile account owner or have authorization from the account owner to make purchases and agree to the billingserver Terms of Use (www.billingserver.com/terms).</string>
          <string id="TERMS_OF_USE_LABEL">Terms of Use</string>
          <string id="HOW_IT_WORKS_LABEL">How it works</string>
          <string id="HOW_IT_WORKS_MESSAGE">How does billingserver work?\n\nbillingserver is quick and easy to use:\n\n* Enter mobile number\n* Receive text message confirmation\n* Reply as instructed to confirm\n\nCharges will be made on your mobile bill or deducted from your prepaid account.\n\nIt's that simple - no bank account or credit card needed. We don't even ask for financial details.</string>
          <string id="CONTACT_US_LABEL">Contact us</string>
          <string id="CONTACT_US_MESSAGE">Customer support: www.boku.com/support or call 877-261-3874.</string>
          <string id="PRIVATE_SECURE_LABEL">Private & Secure</string>
          <string id="PRIVATE_SECURE_MESSAGE">billingserver is a private, secure payment service. No bank accounts, credit cards, or personal details are needed. All you need is your mobile phone.n\nEach secure payment requires confirmation via text message to your mobile phone, which only you can see. You approve every payment right from your phone.\n\nbillingserver is the fastest, safest way to pay online </string>
        </strings>
        <images>
          <image id="BILLING SERVER_LOGO_PORTRAIT_BLACK" width="129px" height="53px" url="https://path/to/ billingserver.png" />
        </images>
        <elements>
          <element id="HEADING" type="STRING" string-id="HEADING_STR" />
          <element id="SUBHEADING" type="STRING" string-id="SUBHEADING_STR" />
          <element id="PRICE_DESC" type="STRING" string-id="PRICE_DESC_STR" />
          <element id="SERVICE" type="STRING" string-id="SERVICE_STR" />
          <element id="ITEM" type="STRING" string-id="ITEM_STR" />
          <element id="TERMS" type="STRING" string-id="TERMS_STR" />
          <element id="BRAND_LOGO" type="IMAGE" image-id=" BILLING SERVER_LOGO_PORTRAIT_BLACK" />
        </elements>
        <actions>
          <action id="PURCHASE" type="USER_INPUT" method="POST" url="https://mhc.billingserver.com/1.1/transaction/b368363a00bbddbf794eba33/purchase" label-string-id="PURCHASE_ACTION_LABEL">
            <inputs>
              <input name="msisdn" type="TEXT" validation-regex="^1\\d{10}$" label-string-id="MSISDN_INPUT_LABEL" hint-string-id="MSISDN_INPUT_HINT" />
            </inputs>
          </action>
          <action id="SHOW_TERMS" type="USER_ACTION" method="POST" url="https://mhc.billingserver.com/1.1/transaction/b368363a00bbddbf794eba33/show-terms" label-string-id="TERMS_OF_USE_LABEL"/>
        </actions>
        <tooltips>
          <tooltip id="HOW_IT_WORKS" label-string-id="HOW_IT_WORKS_LABEL" message-string-id="HOW_IT_WORKS_MESSAGE" optional="true" />
          <tooltip id="CONTACT_US" label-string-id="CONTACT_US_LABEL" message-string-id="CONTACT_US_MESSAGE" optional="true" />
          <tooltip id="PRIVATE_AND_SECURE" label-string-id="PRIVATE_SECURE_LABEL" message-string-id="PRIVATE_SECURE_MESSAGE" optional="true" />
        </tooltips>
        <compliance>
          <msisdn-storage-not-allowed>true</msisdn-storage-not-allowed>
        </compliance>
      </checkout>
</transaction>
```

At 26, the merchant server 14 uses data from the XML response received at 24 to display the price and terms and conditions within an interface that is provided to a browser of the consumer mobile phone 12.

The "INPUT" template requires the merchant server 14 to collect user input via the user interface in order to proceed to the next step. The user interface 20 must display a form which may contain one or more input fields for the consumer to fill out and submit back to the merchant server 14.

The "INPUT" template supports displaying one or more of the following input element types:
Free-form text input (type="TEXT")
Select list (type="SELECT")
Checkboxes (type="CHECKBOX")

In most cases, a text input will be required for entering a mobile phone number or a PIN code. Select lists are occasionally required so that consumers can manually select their mobile network. Checkboxes are commonly used for features such as optionally remembering mobile numbers. In some cases, checkboxes are also required on some carriers and/or markets to ensure that consumers manually agree to the terms of use.

The "INPUT" template currently supports two types of form fields:
1. Mobile phone number entry
2. PIN code/ZIP code entry FIG. 2 illustrates an example of a user interface as displayed by the consumer mobile phone 12 or other consumer device at 26 in FIG. 1A.

Figure 2:
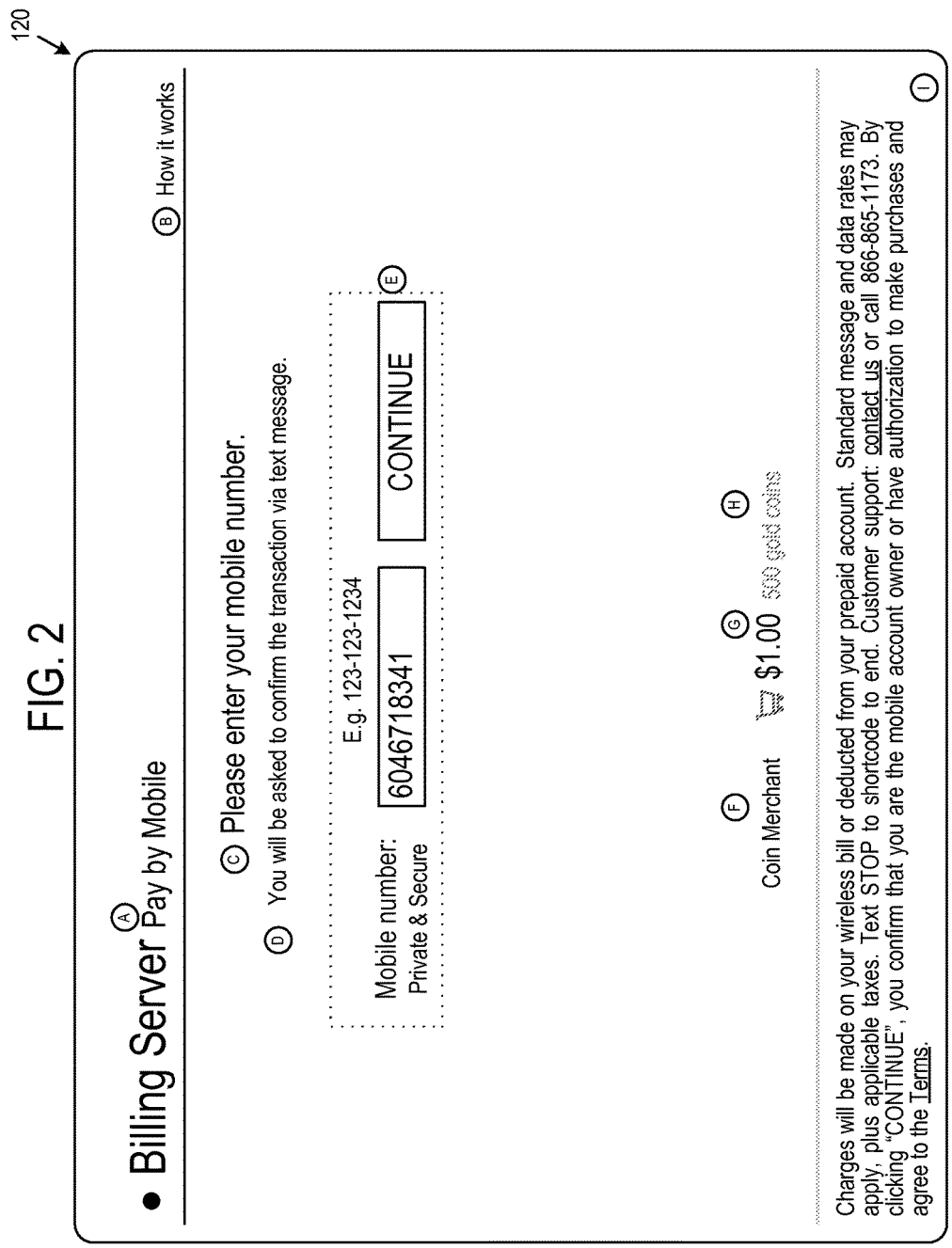
FIGS. 2 to 5 are screen shots of a user interface.

The following fields are displayed by the user interface in FIG. 2 as provided by the XML response transmitted by the billing server 16 at 24 in FIG. 1A and provided by the merchant server 14 at 26 in FIG. 1A.

A. Brand logo
B. Tooltip ("How it works")
C. Heading ("Please enter your mobile number")
D. Subheading ("You will be asked to confirm the transaction via text message")
E. Input form
　i. Text input: mobile number
F. Service name ("Coin Merchant Testing")
G. Price description ("$1.00")
H. Item ("500 gold coins")
I. Terms ["Charges will be made on your wireless bill or deducted from your prepaid account. Standard message and data rates may apply, plus applicable taxes. Text STOP to shortcode to end. Customer support: contact us or call 866-865-1173. By clicking "CONTINUE", you confirm that you are the mobile account owner or have authorization from the account owner to make purchases and agree to the Terms (www.billingserver.com/terms)."]

At 28 in FIG. 1A, the user enters their mobile number into the user interface received at 26. At 30, the merchant server 14 transmits a transaction API request to the billing server 16.

The second transaction API call transmitted at 28 submits the consumer's mobile number as a "USER_INPUT" action to the URL specified at the billing server 16 in the previous response. The msisdn value input is passed in the message body of the HTTP POST request as follows:

Base 'Transaction' API URL:
https://mhc.billingserver.com/1.1/transaction/b368363a00bbddbf794eba33/purchase
HTTP POST Message Body:
msisdn=17781234567

At 32 in FIG. 1A, the billing server 16 transmits a transaction-request XML response to the merchant server 14 with a unique transaction identifier (ID) and SMS instructions to the merchant server 14.

The XML response transmitted at 32 indicates all the UI elements that are required to be displayed to the consumer and the required "POLLING" action for the next request. The 'transaction-status' is "IN_PROGRESS" and the 'template' element value is "PROGRESS". The following example is an example of an XML response that is transmitted at 32.

```
<?xml version="1.0" encoding="UTF-8" standalone="yes"?>
<transaction>
    <api-version>1.1</api-version>
    <trx-id>b368363a00bbddbf794eba33</trx-id>
    <result-code>0</result-code>
    <result-msg>Operation Successful</result-msg>
    <checkout>
        <transaction-status>IN_PROGRESS</transaction-status>
        <percent-complete>33</percent-complete>
        <template>PROGRESS</template>
        <display-state>NORMAL</display-state>
        <strings language="en">
            <string id="HEADING_STR">We have sent you a text message. Reply YES to 34542 to continue.</string>
            <string id="PRICE_DESC_STR">$1.00</string>
            <string id="SERVICE_STR">Coin Merchant Testing</string>
            <string id="ITEM_STR">500 gold coins</string>
            <string id="TERMS_STR">Charges will be made on your wireless bill or deducted
from your prepaid account. Standard message and data rates may apply, plus applicable
taxes. Text STOP to shortcode to end. Customer support: contact us or call 877-261-
3874. By clicking or pressing "CONTINUE", you confirm that you are the mobile
account owner or have authorization from the account owner to make purchases and
agree to the Billing Server Terms of Use (www.billingserver.com/terms).</string>
            <string id="TERMS_OF_USE_LABEL">Terms of Use</string>
            <string id="HOW_IT_WORKS_LABEL">How it works</string>
            <string id="HOW_IT_WORKS_MESSAGE">How does Billing Server
work?\n\nBilling Server is quick and easy to use:\n\n* Enter mobile number\n* Receive
text message confirmation\n* Reply as instructed to confirm\n\nCharges will be made
on your mobile bill or deducted from your prepaid account.n\nIt's that simple - no bank
account or credit card needed. We don't even ask for financial details.</string>
            <string id="CONTACT_US_LABEL">Contact us</string>
```

```xml
<string id="CONTACT_US_MESSAGE">Customer support:
www.billingserver.com/support or call 877-261-3874.</string>
    </strings>
    <images>
        <image id="BILLING SERVER LOGO PORTRAIT BLACK" width="129px"
height="53px" url="https://path/to/billingserver.png" />
    </images>
    <elements>
        <element id="HEADING" type="STRING" string-id="HEADING STR" />
        <element id="PRICE DESC" type="STRING" string-id="PRICE DESC STR" />
        <element id="SERVICE" type="STRING" string-id="SERVICE STR" />
        <element id="ITEM" type="STRING" string-id="ITEM STR" />
        <element id="TERMS" type="STRING" string-id="TERMS STR" />
        <element id="BRAND LOGO" type="IMAGE" image-id=
"BILLING SERVER PORTRAIT BLACK" />
    </elements>
    <actions>
        <action id="POLL" type="POLLING" method="GET"
url="https://mhc.billingserver.com/1.1/transaction/b368363a00bbddbf794eba33"
interval="3000" />
        <action id="SHOW TERMS" type="USER ACTION" method="POST"
url="https://mhc.billingserver.com/1.1/transaction/b368363a00bbddbf794eba33/show-
terms" label-string-id="TERMS OF USE LABEL"/>
    </actions>
    <tooltips>
        <tooltip id="HOW IT WORKS" label-string-id="HOW IT WORKS LABEL"
message-string-id="HOW IT WORKS MESSAGE" optional="true" />
        <tooltip id="CONTACT US" label-string-id="CONTACT US LABEL" message-
string-id="CONTACT US MESSAGE" optional="true" />
    </tooltips>
    compliance>
        <msisdn-storage-not-allowed>true</msisdn-storage-not-allowed>
        </compliance>
    </checkout>
</transaction>
```

Figure 3:
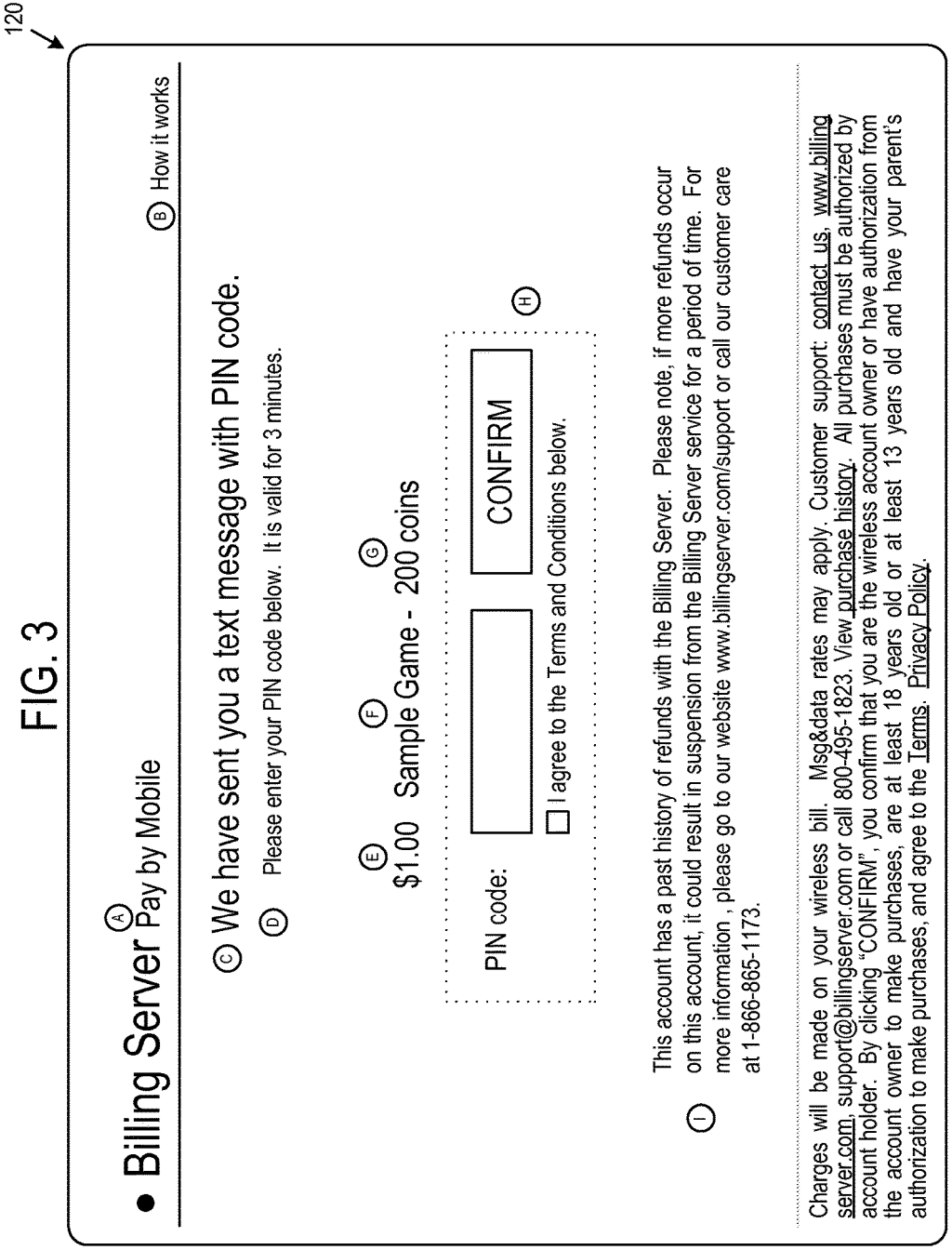

At 34 in FIG. 1A, the merchant server 14 displays instructions to enter a PIN code within a checkout UI that the merchant server 14 transmits to the consumer mobile phone 12. FIG. 3 shows an example of the user interface that is transmitted at 34. The following fields are displayed by the user interface in FIG. 3 as provided by the XML response transmitted by the billing server 16 at 32 in FIG. 1A and provided by the merchant server 14 at 34 in FIG. 1A.

A. Brand logo
B. Tooltip—How it works
C. Heading
D. Subheading
E. Price description
F. Service name
G. Item
H. Input form
  i. Text input: PIN code
  ii. Checkbox: agree to terms and conditions
I. Info
J. Terms At 36 in FIG. 1A, the user enters a PIN code and confirms a purchase. The consumer mobile phone 12 transmits the PIN code and the confirmation through the merchant server 14 to the billing server 16. The progress template is used when the transaction is in progress and the consumer does not need to interact directly with the user interface at that moment. This can happen during the following scenarios:

The consumer received an SMS at the consumer mobile phone 12 from the billing server 16 and is replying to it with the specified keyword (e.g. "YES").
  The consumer sends an SMS from the consumer mobile phone 12 to the billing server 16 with the keyword (e.g. "PAY") as specified in the user interface prompt.
  The consumer is waiting for billing to complete.

Figure 1B:
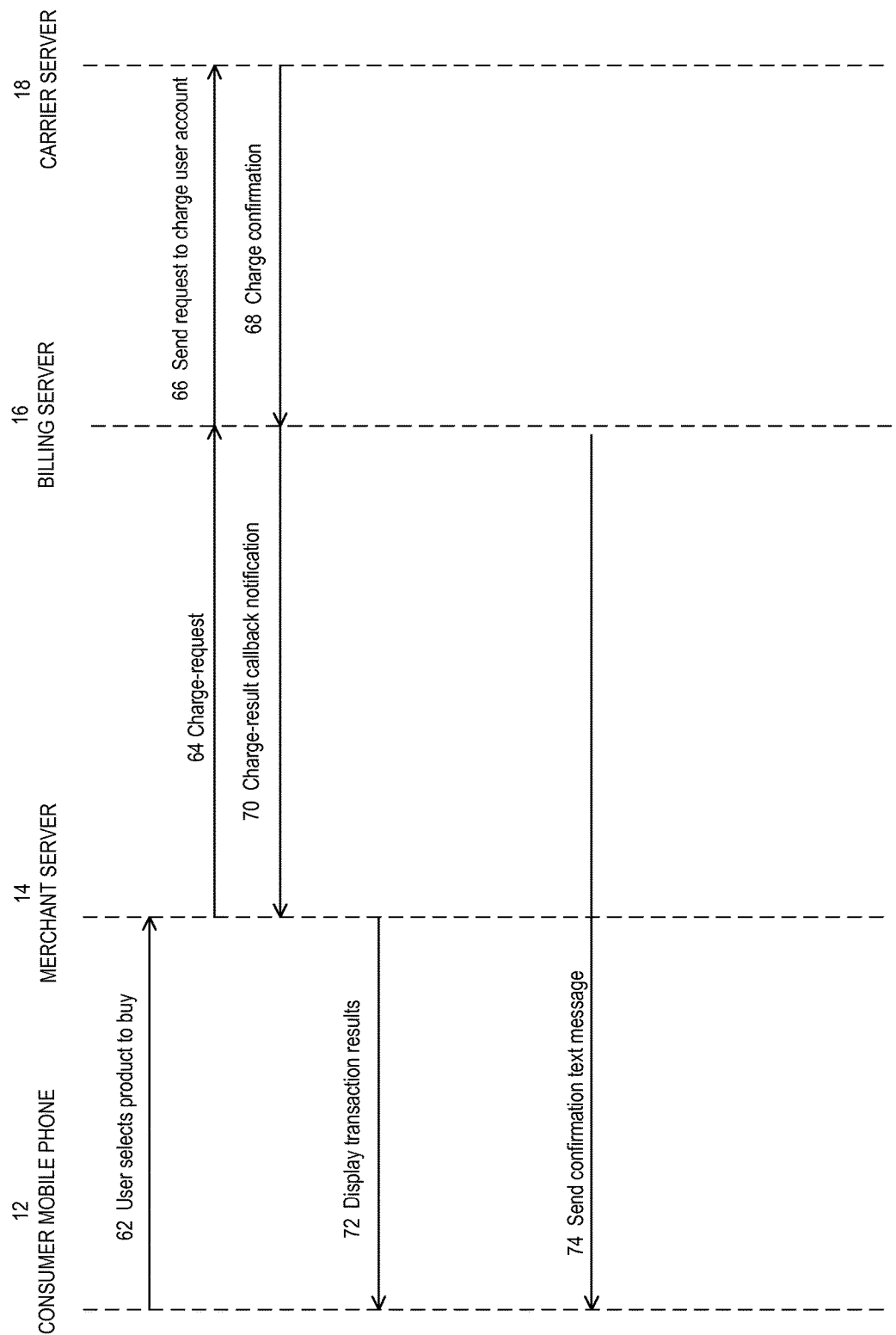
Figure 4:
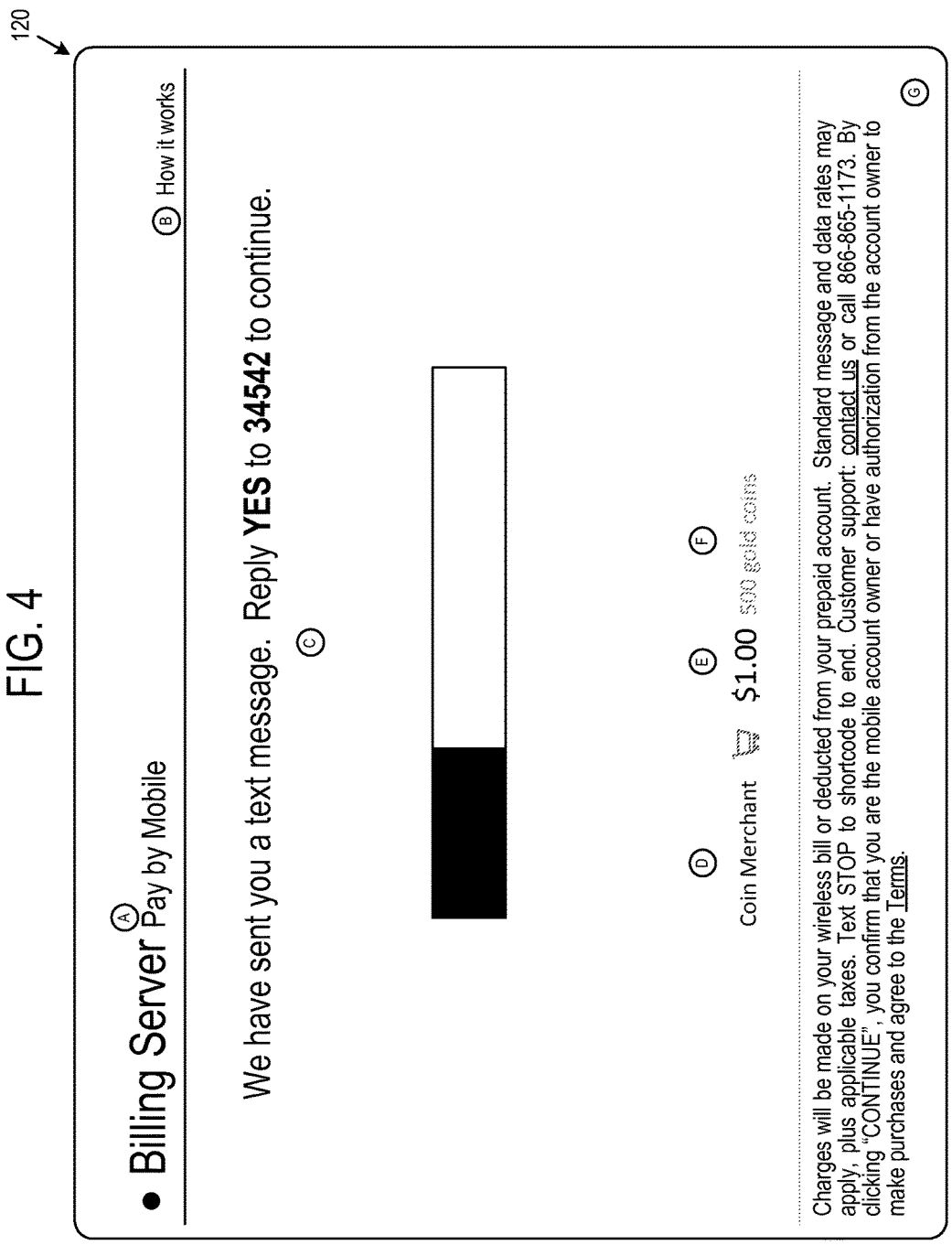

This template type does not require the collection of any user inputs in order to proceed to the next step. FIG. 4 illustrates a view of the user interface that is displayed at the consumer mobile phone 12 or other consumer device. The following fields are displayed by the user interface in FIG. 4 as provided by the XML response transmitted by the billing server 16 at 32 in FIG. 1A and provided by the merchant server 14 to the consumer mobile phone 12 for the scenario where the consumer responds YES to a text message instead of transmitting the PIN code at 36 in FIG. 1.

A. Brand logo
B. Tooltip ("How it works")
C. Heading ("We have sent you a text message. Reply YES to 34542 to continue")
D. Service name ("Coin Merchant Testing")
E. Price description ("$1.00")
F. Item ("500 gold coins")
G. Terms ["Charges will be made on your wireless bill or deducted from your prepaid account. Standard message and data rates may apply, plus applicable taxes. Text STOP to shortcode to end. Customer support: contact us or call 866-865-1173. By clicking "CONTINUE", you confirm that you are the mobile account owner or have authorization from the account owner to make purchases and agree to the Terms (www.billingserver.com/terms)."]

At 38 in FIG. 1A, the billing server 16 sends a request to charge a user account on the carrier server 18 for an amount based on the price received at 20. The user account on the carrier server 18 is identified by the mobile number entered at 28 in FIG. 1A and is charged by an amount based on the amount received at 38. At 40, the carrier server 18 transmits a charge confirmation to the billing server 16. At 42, the billing server 16 transmits a charge-result callback notification to the merchant server 14.

At 44, the merchant server 14 transmits a further transaction API request to the billing server 16.

The transaction API call transmitted at 46 is a polling action to the URL specified at the billing server 16 in the previous response at 32.

At 46, the billing server 16 transmits a transaction XML response with UI elements and a phone-on-file opt-in check box to the merchant server 14. The XML response transmitted at 46 indicates all the UI elements required to be displayed to the consumer and the required "POLLING" action for the next request. The transaction status is returned as in progress and the 'template' element value is progress. The following is an example of an XML response that is transmitted at 46.

```xml
<?xml version="1.0" encoding="UTF-8" standalone="yes"?>
<transaction>
  <api-version>1.1</api-version>
  <trx-id>b368363a00bbddbf794eba33</trx-id>
  <result-code>0</result-code>
  <result-msg>Operation Successful</result-msg>
  <checkout>
    <transaction-status>IN_PROGRESS</transaction-status>
    <percent-complete>66</percent-complete>
    <template>PROGRESS</template>
    <display-state>NORMAL</display-state>
    <strings language="en">
      <string id="HEADING_STR">Receiving payment confirmation from your mobile network...</string>
      <string id="SUBHEADING_STR">Confirmed: $0.00 of $1.00</string>
      <string id="PRICE_DESC_STR">$1.00</string>
      <string id="SERVICE_ STR">Coin Merchant Testing</string>
      <string id="ITEM_ STR">500 gold coins</string>
      <string id="TERMS_STR">Charges will be made on your wireless bill or deducted
from your prepaid account. Standard message and data rates may apply, plus applicable
taxes. Text STOP to shortcode to end. Customer support: contact us or call 877-261-
3874. By clicking or pressing "CONTINUE", you confirm that you are the mobile
account owner or have authorization from the account owner to make purchases and
agree to the Billing Server Terms of Use (www.billingserver.com/terms).</string>
      <string id="TERMS_OF_USE_LABEL">Terms of Use</string>
      <string id="HOW_IT_WORKS_LABEL">How it works</string>
      <string id="HOW_IT_WORKS_MESSAGE">How does Billing Server work?\n\nBilling Server is quick and easy to use:\n\n* Enter mobile number\n* Receive text message confirmation\n* Reply as instructed to confirm\n\nCharges will be made on your mobile bill or deducted from your prepaid account.\n\nIt's that simple - no bank account or credit card needed. We don't even ask for financial details.</string>
      <string id="CONTACT_US_LABEL">Contact us</string>
      <string id="CONTACT_US_MESSAGE">Customer support: www.billingserver.com/support or call 877-261-3874.</string>
    </strings>
    <images>
      <image id="BILLING_SERVER_LOGO_PORTRAIT_BLACK" width="129px" height="53px" url="https://path/to/billingserver.png" />
    </images>
    <elements>
      <element id="HEADING" type="STRING" string-id="HEADING_STR" />
      <element id="SUBHEADING" type="STRING" string-id="SUBHEADING_STR" />
      <element id="PRICE_DESC" type="STRING" string-id="PRICE_DESC_STR" />
      <element id="SERVICE" type="STRING" string-id="SERVICE_STR" />
      <element id="ITEM" type="STRING" string-id="ITEM_STR" />
      <element id="TERMS" type="STRING" string-id="TERMS_STR" />
      <element id="BRAND_LOGO" type="IMAGE" image-id="BILLING_SERVER_LOGO_PORTRAIT_BLACK" />
    </elements>
    <actions>
      <action id="POLL" type="POLLING" method="GET" url="https://mhc.billingserver.com/1.1/transaction/b368363a00bbddbf794eba33" interval="3000" />
      <action id="SHOW_TERMS" type="USER_ACTION" method="POST" url="https://mhc. billingserver.com/1.1/transaction/b368363a00bbddbf794eba33/show-terms" label-string-id="TERMS_OF_USE_LABEL"/>
    </actions>
    <tooltips>
      <tooltip id="HOW_IT_WORKS" label-string-id="HOW_IT_WORKS_LABEL" message-string-id="HOW_IT_WORKS_MESSAGE" optional="true" />
      <tooltip id="CONTACT_US" label-string-id="CONTACT_US_LABEL" message-string-id="CONTACT US MESSAGE" optional="true" />
    </tooltips>
    <compliance>
      <msisdn-storage-not-allowed>true</msisdn-storage-not-allowed>
    </compliance>
  </checkout>
</transaction>
```

Once the transaction is completed by receiving the charge confirmation 40, the transaction status is returned as completed and the template element value is "COMPLETED." As such, if two transaction API requests such as 44 are received before and after the charge confirmation at 40, different values for transaction status and for the template element value will be returned.

At 48 in FIG. 1A, the billing server 16 also sends a confirmation text message to the consumer mobile phone 12. At 50, the merchant server 14 displays confirmation of the purchase and a phone-on-file check box within the interface that the merchant server 14 transmits to the consumer mobile phone 12. A confirmation template is transmitted by the merchant server 14 to the consumer mobile phone 12 once transactions have been completed. The merchant server 14 displays a final confirmation message to the consumer in the user interface and provides a way for the consumers to navigate away from the confirmation screen back to main site of the merchant server 14.

Figure 5:
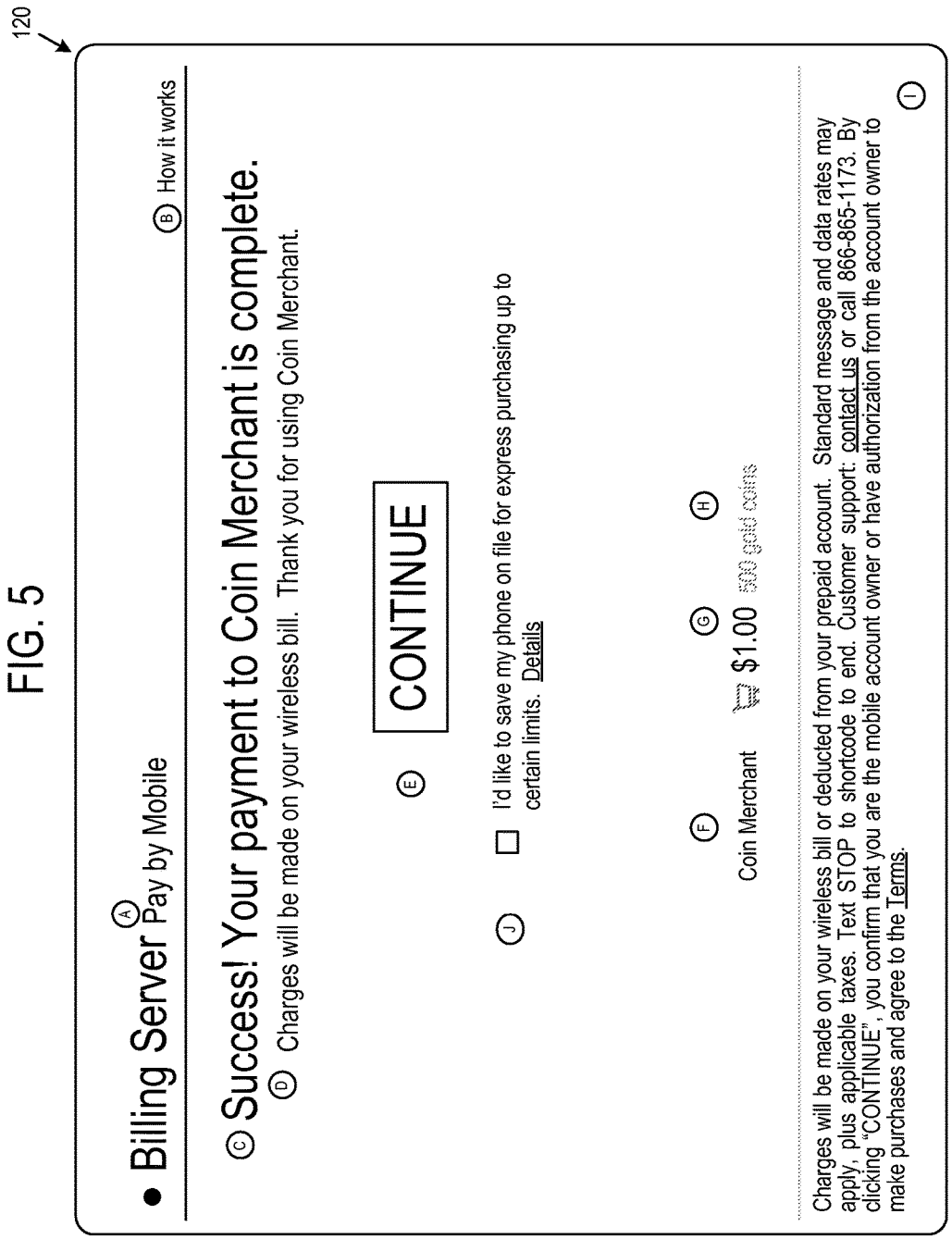

FIG. 5 illustrates a view of the user interface that is displayed at the consumer mobile phone 12.

The following fields are displayed by the user interface in FIG. 5 as provided by the XML response transmitted by the billing server 16 at 46 in FIG. 1

A. Brand logo
B. Tooltip ("How it works")
C. Heading ("Success! Your payment to Coin Merchant Testing is complete")
D. Subheading ("Charges will be made on your wireless bill. Thank you for using Coin Merchant")
E. "Continue" button (This button is not actually returned in the 'transaction' API call response; it is just an example. Merchants control how consumers are given the option to navigate away from the final screen of the Billing Server user interface).
F. Service name ("Coin Merchant Testing")
G. Price description ("$1.00")
H. Item ("500 gold coins")
I. Terms ["Charges will be made on your wireless bill or deducted from your prepaid account. Standard message and data rates may apply, plus applicable taxes. Text STOP to shortcode to end. Customer support: contact us or call 866-865-1173. By clicking "CONTINUE", you confirm that you are the mobile account owner or have authorization from the account owner to make purchases and agree to the Terms (www.billing-server.com/terms)."]
J. Checkbox to opt-in to phone-on-file billing.

At 52 in FIG. 1A, the user checks the box for phone-on-file opt-in. A signal including the consumer's phone-on-file opt-in is transmitted from the consumer mobile phone 12 through the merchant server 14 to the billing server 16.

At 54, the merchant server 14 transmits a transaction API request to the billing server 16. A transaction API call is used that is another "POLLING" action to the URL specified in the previous response based on the polling interval.

At 56, the billing server 16 returns a transaction XML response with a phone-on-file opt-in registration status to the merchant server 14. The XML response indicates all the UI elements that are required to be displayed to the consumer. The transaction-status is returned as complete and template element value is confirmation The following is an example of an XML response that is transmitted at 56.

```
<?xml version="1.0" encoding="UTF-8" standalone="yes"?>
<transaction>
    <api-version1.1</api-version>
    <trx-id>b368363a00bbddbf794eba33</trx-id>
    <result-code>0</result-code>
    <result-msg>Operation Successful</result-msg>
    <checkout>
        <transaction-status>COMPLETE</transaction-status>
        <percent-complete>100</percent-complete>
        <template>CONFIRMATION</template>
        <display-state>NORMAL</display-state>
        <strings language="en">
            <string id="HEADING_STR">Success! Your payment to Coin Merchant Testing is
complete.</string>
            <string id="SUBHEADING_STR">Charges will be made on your wireless bill.
Thank you for using Billing Server.</string>
            <string id="PRICE_DESC_STR">$1.00</string>
            <string id="SERVICE_STR">Coin Merchant Testing</string>
            <string id="ITEM_STR">500 gold coins</string>
            <string id="TERMS_STR">Charges will be made on your wireless bill or
deducted
from your prepaid account. Standard message and data rates may apply, plus applicable
taxes. Text STOP to shortcode to end. Customer support: contact us or call 877-261-
3874. By clicking or pressing "CONTINUE", you confirm that you are the mobile
account owner or have authorization from the account owner to make purchases and
agree to the Billing Server Terms of Use (www.billingserver.com/terms).</string>
            <string id="TERMS_OF_USE_LABEL">Terms of Use</string>
            <string id="HOW_IT_WORKS_LABEL">How it works</string>
            <string id="HOW_IT_WORKS_MESSAGE">How does Boku work?\n\nBilling
Server is quick and easy to use:\n\n* Enter mobile number\n* Receive text message
confirmation\n* Reply as instructed to confirm\n\nCharges will be made on your mobile
bill or deducted from your prepaid account.\n\nIt's that simple - no bank account or
credit card needed. We don't even ask for financial details.</string>
            <string id="CONTACT_US_LABEL">Contact us</string>
            <string id="CONTACT_US_MESSAGE">Customer support:
www.billingserver.com/support or call 877-261-3874.</string>
        </strings>
        <images>
            <image id="BILLING_SERVER_LOGO_PORTRAIT_BLACK" width="129px"
height="53px" url="https://path/to/billingserver.png" />
```

```xml
    </images>
    <elements>
        <element id="HEADING" type="STRING" string-id="HEADING_STR" />
        <element id="SUBHEADING" type="STRING" string-id="SUBHEADING_STR" />
        <element id="PRICE_DESC" type="STRING" string-id="PRICE_DESC_STR" />
        <element id="SERVICE" type="STRING" string-id="SERVICE_STR" />
        <element id="ITEM" type="STRING" string-id="ITEM_STR" />
        <element id="TERMS" type="STRING" string-id="TERMS_STR" />
        <element id="BRAND_LOGO" type="IMAGE" image-id="BILLING_SERVER_LOGO_PORTRAIT_BLACK" />
    </elements>
    <actions>
        <action id="SHOW_TERMS" type="USER_ACTION" method="POST" url="https://mhc.billingserver.com/1.1/transaction/b368363a00bbddbf794eba33/show-terms" label-string-id="TERMS_OF_USE_LABEL"/>
    </actions>
    <tooltips>
        <tooltip id="HOW_IT_WORKS" label-string-id="HOW_IT_WORKS_LABEL" message-string-id="HOW_IT_WORKS_MESSAGE" optional="true" />
        <tooltip id="CONTACT_US" label-string-id="CONTACT_US_LABEL" message-string-id="CONTACT_US_MESSAGE" optional="true" />
    </tooltips>
    <compliance>
        <msisdn-storage-not-allowed>true</msisdn-storage-not-allowed>
    </compliance>
</checkout>
</transaction>
```

At 58, the billing server 16 transmits a phone-on-file callback to the merchant server 14. At 60, the billing server 16 sends a confirmation to confirm the phone-on-file opt-in to the consumer mobile phone 12. At 62 in FIG. 1B, the user selects product and price details to buy a product on the merchant server 14. At 64, the merchant server 14 transmits a charge request to the billing server 16. At 66, the billing server 16 sends a request to charge the user account at the carrier server 18. At 68, the carrier server 18 sends a charge confirmation to the billing server 16. At 70, the billing server 16 sends a charge-result callback notification to the merchant server 14. At 72, the merchant server 14 displays the transaction results for the transaction initiated at 62 within the interface that is transmitted by the merchant server 14 to the consumer mobile phone 12. At 74, the billing server 16 sends a confirmation text message to the consumer mobile phone 12 to confirm the purchase details thereof.

Further details of phone-on-file opt-in are described in U.S. patent application Ser. No. 13/927,574 filed on Jun. 26, 2013, which is incorporated herein.

Figure 6:
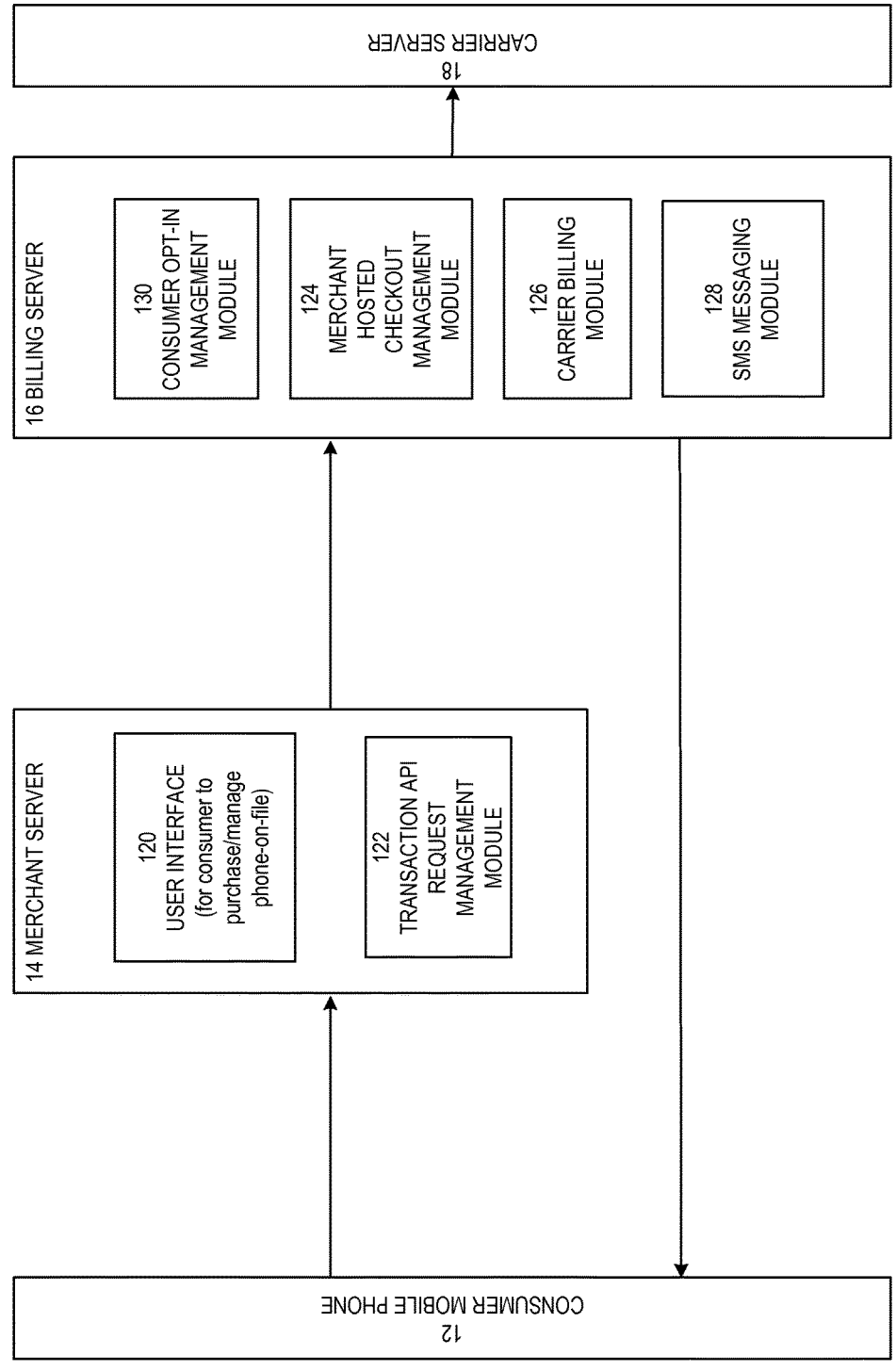
FIG. 6 is a block diagram of a merchant hosted checkout interface.

As shown in FIG. 6, the merchant server 14 includes a user interface 120 and a transaction API request management module 122. The transaction API request management module 122 is primarily responsible for transmitting transaction API requests as at 22, 30, 44 and 54 in FIG. 1A. The user interface 20 displays the views in FIGS. 2 to 5. As further shown, the billing server 16 includes a merchant hosted checkout management system 124, a carrier billing module 126, as SMS messaging module 128 and a consumer opt-in management module 130. The merchant hosted checkout management module 124 interacts with and provides responses to the transaction API request management module 122. The carrier billing module 126 interacts with the carrier server 18 to place a charge. The SMS messaging module 128 communicates over a cellular phone wireless network with the consumer mobile phone 12. The consumer opt-in management module 130 communicates with the merchant server 14 and manages phone-on-file opt-in.

The merchant hosted checkout system 10 allows for the merchant server 14 to process payment through a user interface constructed to be both functional and compliant with standards set forth by the billing server 16. The billing server 16 still maintains control over the standards that are set forth by the carrier operating the carrier server 18.

Figure 7:
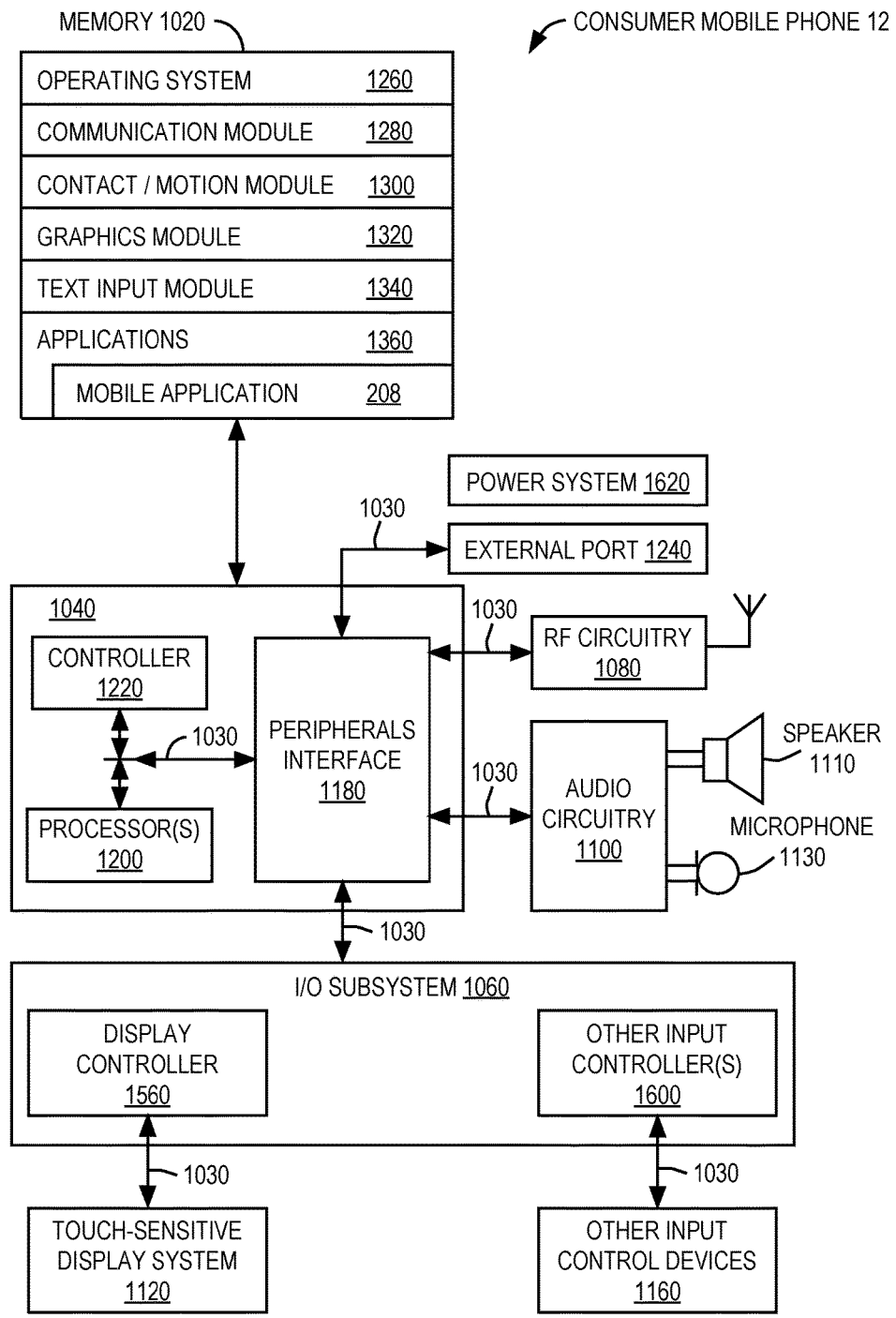
FIG. 7 is a block diagram of the consumer mobile phone illustrating SmartPhone features thereof.

FIG. 7 is a block diagram illustrating the consumer mobile phone 12, illustrating a touch-sensitive display 1120 or a "touch screen" for convenience. The consumer mobile phone 12 includes a memory 1020 (which may include one or more computer readable storage mediums), a memory controller 1220, one or more processing units (CPU's) 1200, a peripherals interface 1180, RF circuitry 1080, audio circuitry 1100, a speaker 1110, a microphone 1130, an input/output (I/O) subsystem 1060, other input or control devices 1160 and an external port 1240. These components communicate over one or more communication buses or signal lines 1030.

The various components shown in FIG. 7 may be implemented in hardware, software or a combination of hardware and software, including one or more signal processing and/or application specific integrated circuits.

The memory 1020 may include high-speed random access memory and may also include non-volatile memory, such as one or more magnetic disk storage devices, flash memory devices, or other non-volatile solid-state memory devices. Access to the memory 1020 by other components of the consumer mobile phone 12, such as the CPU 1200 and the peripherals interface 1180, is controlled by the memory controller 1220.

The peripherals interface 1180 connects the input and output peripherals of the device to the CPU 1200 and memory 1020. The one or more processors 1200 run or execute various software programs and/or sets of instructions stored in the memory 1020 to perform various functions for the consumer mobile phone 12 and to process data.

The RF (radio frequency) circuitry 1080 receives and sends RF signals, also called electromagnetic signals. The RF circuitry 1080 converts electrical signals to/from electromagnetic signals and communicates with communications networks and other communications devices via the electromagnetic signals. The RF circuitry 1080 includes well-known circuitry for performing these functions, including an antenna system, an RF transceiver, one or more amplifiers, a tuner, one or more oscillators, a digital signal processor, a CODEC chipset, a subscriber identity module (SIM) card, memory, and so forth. The RF circuitry 1080 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies that are known in the art.

The audio circuitry 1100, the speaker 1110, and the microphone 1130 provide an audio interface between a user and the consumer mobile phone 12. The audio circuitry 1100 receives audio data from the peripherals interface 1180, converts the audio data to an electrical signal, and transmits the electrical signal to the speaker 1110. The speaker 1110 converts the electrical signal to human-audible sound waves. The audio circuitry 1100 also receives electrical signals converted by the microphone 1130 from sound waves. The audio circuitry 1100 converts the electrical signal to audio data and transmits the audio data to the peripherals interface 1180 for processing. The audio circuitry 1100 also includes a headset jack serving as an interface between the audio circuitry 1100 and removable audio input/output peripherals, such as output-only headphones or a headset with both output (e.g., a headphone for one or both ears) and input (e.g., a microphone).

The I/O subsystem 1060 connects input/output peripherals on the consumer mobile phone 12, such as the touch screen 1120 and other input/control devices 1160, to the peripherals interface 1180. The I/O subsystem 1060 includes a display controller 1560 and one or more input controllers 1600 for other input or control devices. The one or more input controllers 1600 receive/send electrical signals from/to other input or control devices 1160. The other input/control devices 1160 may include physical buttons (e.g., push buttons, rocker buttons, etc.), dials, slider switches, joysticks, click wheels, and so forth all serving as forming part of an interface. The input controllers 1600 may be connected to any of the following: a keyboard, infrared port, USB port, and a pointer device such as a mouse. The one or more buttons may include an up/down button for volume control of the speaker 1110 and/or the microphone 1130. The one or more buttons may include a push button. A quick press of the push button may disengage a lock of the touch screen 1120 or begin a process that uses gestures on the touch screen to unlock the device. A longer press of the push button may turn power to the consumer mobile phone 12 on or off. The touch screen 1120 is used to implement virtual or soft buttons and one or more soft keyboards.

The touch-sensitive touch screen 1120 provides an input interface and an output interface between the device and a user. The display controller 1560 receives and/or sends electrical signals from/to the touch screen 1120. The touch screen 1120 displays visual output to the user. The visual output may include graphics, text, icons, video, and any combination thereof (collectively termed "graphics"). In some embodiments, some or all of the visual output may correspond to user-interface objects, further details of which are described below.

A touch screen 1120 has a touch-sensitive surface, sensor or set of sensors that accepts input from the user based on haptic and/or tactile contact. The touch screen 1120 and the display controller 1560 (along with any associated modules and/or sets of instructions in memory 1020) detect contact (and any movement or breaking of the contact) on the touch screen 1120 and converts the detected contact into interaction with user-interface objects (e.g., one or more soft keys, icons, web pages or images) that are displayed on the touch screen. In an exemplary embodiment, a point of contact between a touch screen 1120 and the user corresponds to a finger of the user.

The touch screen 1120 may use LCD (liquid crystal display) technology, or LPD (light emitting polymer display) technology, although other display technologies may be used in other embodiments. The touch screen 1120 and the display controller 1560 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 1120.

The user may make contact with the touch screen 1120 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

The consumer mobile phone 12 also includes a power system 1620 for powering the various components. The power system 1620 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The software components stored in memory 1020 include an operating system 1260, a communication module (or set of instructions) 1280, a contact/motion module (or set of instructions) 1300, a graphics module (or set of instructions) 1320, a text input module (or set of instructions) 1340, and applications (or set of instructions) 1360.

The operating system 1260 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 1280 facilitates communication with other devices over one or more external ports 1240 and also includes various software components for handling data received by the RF circuitry 1080 and/or the external port 1240. The external port 1240 (e.g., Universal Serial Bus (USB), FIREWIRE, etc.) is adapted for coupling directly to other devices or indirectly over a network (e.g., the Internet, wireless LAN, etc.).

The contact/motion module 1300 may detect contact with the touch screen 1120 (in conjunction with the display controller 1560) and other touch sensitive devices (e.g., a touchpad or physical click wheel). The contact/motion module 1300 includes various software components for performing various operations related to detection of contact, such as determining if contact has occurred, determining if there is movement of the contact and tracking the movement across the touch screen 1120, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). The contact/motion module 1300 and the display controller 1560 also detects contact on a touchpad.

The graphics module 1320 includes various known software components for rendering and displaying graphics on the touch screen 1120, including components for changing the intensity of graphics that are displayed. As used herein, the term "graphics" includes any object that can be displayed to a user, including text, web pages, icons (such as user-interface objects including soft keys), digital images, videos, animations and the like.

The text input module 1340, which may be a component of graphics module 1320, provides soft keyboards for entering text in various applications (e.g., contacts, e-mail, IM, blogging, browser, and any other application that needs text input). The applications 1360 may include the mobile application 208.

Figure 8:
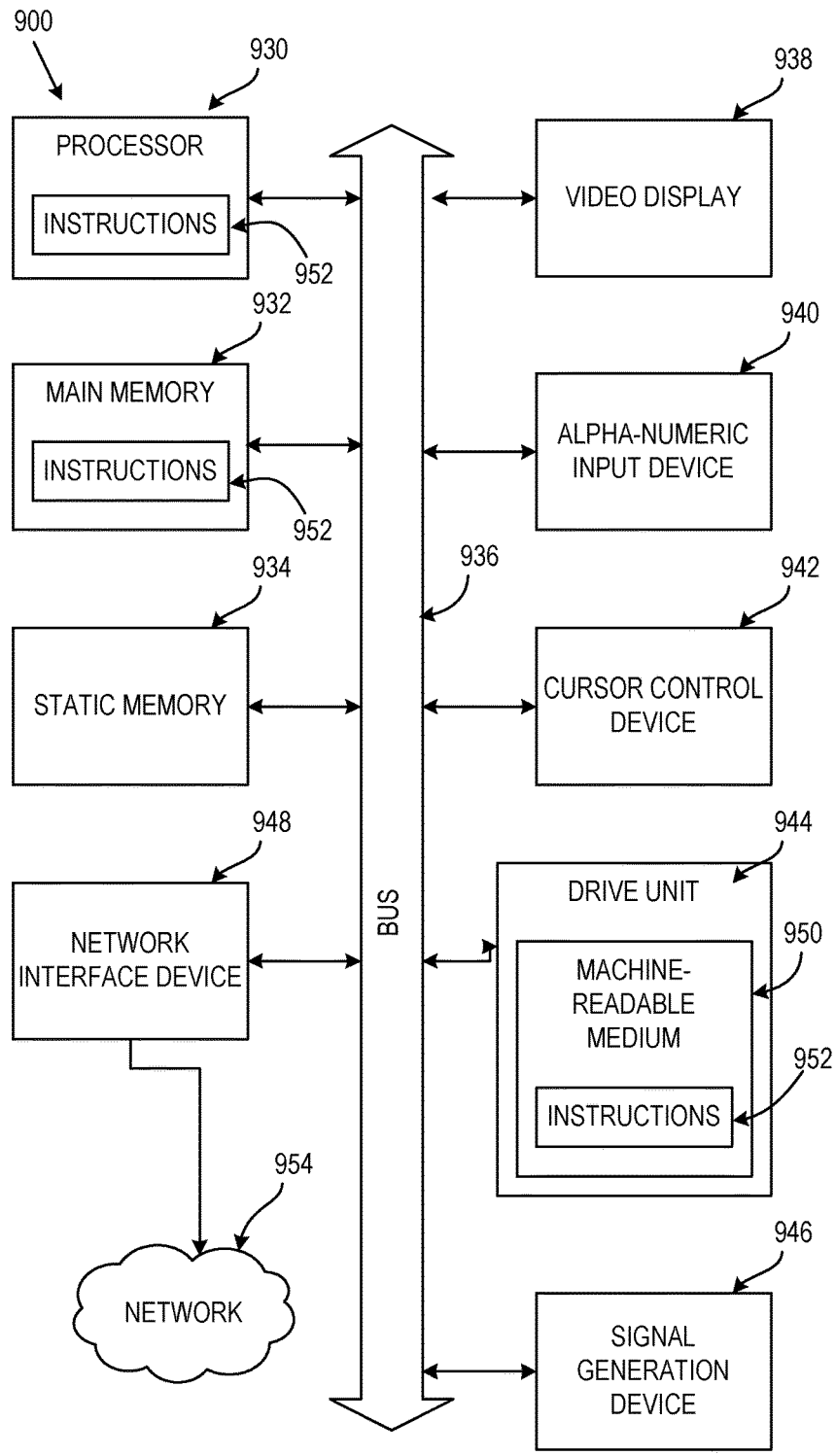
FIG. 8 is a block diagram of a machine in the form of a computer system forming part of the merchant managed subscription system.

FIG. 8 shows a diagrammatic representation of a machine in the exemplary form of a computer system 900 within which a set of instructions, for causing the machine to perform any one or more of the methodologies discussed herein, may be executed. In alternative embodiments, the machine operates as a standalone device or may be connected (e.g., networked) to other machines. In a network deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processor 930 (e.g., a central processing unit (CPU), a graphics processing unit (GPU), or both), a main memory 932 (e.g., read-only memory (ROM), flash memory, dynamic random access memory (DRAM) such as synchronous DRAM (SDRAM) or Rambus DRAM (RDRAM), etc.), and a static memory 934 (e.g., flash memory, static random access memory (SRAM, etc.), which communicate with each other via a bus 936.

The computer system 900 may further include a video display 938 (e.g., a liquid crystal display (LCD) or a cathode ray tube (CRT)). The computer system 900 also includes an alpha-numeric input device 940 (e.g., a keyboard), a cursor control device 942 (e.g., a mouse), a disk drive unit 944, a signal generation device 946 (e.g., a speaker), and a network interface device 948.

The disk drive unit 944 includes a machine-readable medium 950 on which is stored one or more sets of instructions 952 (e.g., software) embodying any one or more of the methodologies or functions described herein. The software may also reside, completely or at least partially, within the main memory 932 and/or within the processor 930 during execution thereof by the computer system 900, the memory 932 and the processor 930 also constituting machine readable media. The software may further be transmitted or received over a network 954 via the network interface device 948.

While the instructions 952 are shown in an exemplary embodiment to be on a single medium, the term "machine-readable medium" should be taken to understand a single medium or multiple media (e.g., a centralized or distributed database or data source and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present invention. The term "machine-readable medium" shall accordingly be taken to include, but not be limited to, solid-state memories and optical and magnetic media.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A method of managing transactions with a merchant server comprising:

receiving, with the merchant server, a selection for a product from a consumer device;

transmitting, with the merchant server in response to the selection, a first transaction application programmable interface (API) request from the merchant server to a billing server, including parameters, the billing server to transmit a list of user interface elements to display on a consumer device based on the parameters to the merchant server;

receiving, with the merchant server, a first transaction request response from the billing server to the first transaction API request, including a transaction status, a user interface template type, the list of user interface elements to display to the consumer device based on the parameters, and next actions for the merchant server to take;

displaying, with the merchant server, a template on the consumer device according to the template type, the template including values of the elements received from the billing server;

executing, with the merchant server, an action based on the next actions;

transmitting, with the merchant server, a price to the consumer device;

receiving, with the merchant server, a mobile subscriber integrated services digital network-number (msisdn) from the consumer device;

transmitting, with the merchant server, a second transaction API request from the merchant server to the billing server, including the msisdn, the billing server to confirm the transaction with the consumer device in response to receiving the second transaction API request, and if the transaction is confirmed:

send, with the billing server, a request to charge a user account at a carrier server corresponding to the msisdn;

receiving, with the billing server, a charge confirmation from the carrier server at the billing server in response to the request sent to the carrier server; and transmitting, with the billing server, a charge result callback notification to the merchant server in response to receiving the charge confirmation; and receiving, with the merchant server, the charge result callback notification from the billing server in response to the second transaction API call.

2. The method of claim 1, wherein the parameters of the first transaction API request include country, desc, merchant-id, service-id, sig and timestamp.

3. The method of claim 1, wherein the first transaction request response includes a required "USER_INPUT" action for the second transaction API request.

4. The method of claim 1, wherein the first transaction request response includes a uniform resource locator (URL) and is transmitted to the URL at the billing server.

5. The method of claim 1, further comprising:
receiving, with the merchant server, a second transaction request response to the second transaction API request from the billing server including a transaction status user interface template type, a list of user interface elements to display to the consumer device, and next actions for the merchant server to take; and displaying, with the merchant server, the user interface element on the consumer device.

6. The method of claim 5, wherein the first transaction request response returns the transaction status as "NOT_STARTED" and the user interface template type as "INPUT", and the second transaction request response returns the transaction status as "IN_PROGRESS" and the user interface template type as "PROGRESS".

7. The method of claim 6, further comprising:
transmitting, with the merchant server, a third transaction API request from the merchant server at the billing server after transmitting the second transaction API request to the billing server, the third transaction API request being transmitted to a URL at the billing server specified in one of the transaction request responses; and receiving, with the merchant server, a transaction response to the third transaction API request wherein the transaction status is returned as "IN_PROGRESS" and the user interface template type is "PROGRESS".

8. The method of claim 7, further comprising:
transmitting, with the merchant server, a fourth transaction API request from the merchant server at the billing server after transmitting the third transaction API request to the billing server, the fourth transaction API request being transmitted to a URL at the billing server specified in one of the transaction request responses; and receiving, with the merchant server, a transaction response to the fourth transaction API request wherein the transaction status is returned as "COMPLETED" and the user interface template type is "COMPLETED".

9. A non-transitory computer-readable medium having stored thereon a set of instructions which, when executed by a processor of a computer performs a method of managing transactions with a billing server comprising:
receiving, with the merchant server, a selection for a product from a consumer device;

transmitting, with the merchant server in response to the selection, a first transaction application programmable interface (API) request from the merchant server to a billing server, including parameters, the billing server to transmit a list of user interface elements to display on a consumer device based on the parameters to the merchant server;

receiving, with the merchant server, a first transaction request response from the billing server to the first transaction API request, including a transaction status, a user interface template type, the list of user interface elements to display to the consumer device based on the parameters, and next actions for the merchant server to take;

displaying, with the merchant server, a template on the consumer device according to the template type, the template including values of the elements received from the billing server;

executing, with the merchant server, an action based on the next actions;

transmitting, with the merchant server, a price to the consumer device;

receiving, with the merchant server, a mobile subscriber integrated services digital network-number (msisdn) from the consumer device;

transmitting, with the merchant server, a second transaction API request from the merchant server to the billing server, including the msisdn, the billing server to confirm the transaction with the consumer device in response to receiving the second transaction API request, and if the transaction is confirmed:
send, with the billing server, a request to charge a user account at a carrier server corresponding to the msisdn;

receiving, with the billing server, a charge confirmation from the carrier server at the billing server in response to the request sent to the carrier server; and transmitting, with the billing server, a charge result callback notification to the merchant server in response to receiving the charge confirmation; and receiving, with the merchant server, the charge result callback notification from the billing server in response to the second transaction API call.

10. A merchant server comprising:
a processor;
a computer-readable medium connected to the processor;
a transaction application programmable interface (API) request management module stored on the computer-readable medium and executable by the processor to:
receive, with the merchant server, a selection for a product from a consumer device;

transmit, with the merchant server in response to the selection, a first transaction application programmable interface (API) request from the merchant server to a billing server, including parameters, the billing server to transmit a list of user interface elements to display on a consumer device based on the parameters to the merchant server;

receive, with the merchant server, a first transaction request response from the billing server to the first transaction API request, including a transaction status, a user interface template type, the list of user interface elements to display to the consumer device based on the parameters, and next actions for the merchant server to take;

displaying, with the merchant server, a template on the consumer device according to the template type, the template including values of the elements received from the billing server;

executing, with the merchant server, an action based on the next actions;

transmit, with the merchant server, a price to the consumer device;

receive, with the merchant server, a mobile subscriber integrated services digital network-number (msisdn) from the consumer device;

transmit, with the merchant server, a second transaction API request from the merchant server to the billing server, including the msisdn, the billing server to confirm the transaction with the consumer device in response to receiving the second transaction API request, and if the transaction is confirmed:
- send, with the billing server, a request to charge a user account at a carrier server corresponding to the msisdn;
- receive, with the billing server, a charge confirmation from the carrier server at the billing server in response to the request sent to the carrier server; and
- transmit, with the billing server, a charge result callback notification to the merchant server in response to receiving the charge confirmation; and receive, with the merchant server, the charge result callback notification from the billing server in response to the second transaction API call.

11. The merchant server of claim 10, further comprising:

a user interface stored on the computer-readable medium, wherein the transmission of the price to the consumer device is within the user interface.

* * * * *